United States Patent
Abraham et al.

(10) Patent No.: US 11,861,332 B2
(45) Date of Patent: Jan. 2, 2024

(54) STRING LOCALIZATION FOR UNIVERSAL USE

(71) Applicant: MicroStrategy Incorporated, Tysons Corner, VA (US)

(72) Inventors: Eduardo Abraham, McLean, VA (US); Herminio Carames, Lansdowne, VA (US); Fengxiang Chang, Fairfax, VA (US); Kewei Hu, Broadlands, VA (US); Lukasz Zwolinski, Warsaw (PL)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 304 days.

(21) Appl. No.: 17/409,859

(22) Filed: Aug. 24, 2021

(65) Prior Publication Data

US 2023/0062336 A1 Mar. 2, 2023

(51) Int. Cl.
*G06F 8/33* (2018.01)
*G06F 16/23* (2019.01)
*G06F 16/25* (2019.01)

(52) U.S. Cl.
CPC ............ *G06F 8/33* (2013.01); *G06F 16/2365* (2019.01); *G06F 16/258* (2019.01)

(58) Field of Classification Search
None
See application file for complete search history.

(56) References Cited

U.S. PATENT DOCUMENTS

| | | | | |
|---|---|---|---|---|
| 7,774,195 B2* | 8/2010 | Kohlmeier | ............. | G06F 9/454 717/136 |
| 7,788,648 B2* | 8/2010 | Bossom | ................. | G06F 9/454 717/136 |
| 7,793,156 B2* | 9/2010 | Tsurumi | ............. | G06F 11/3692 714/38.14 |
| 9,015,030 B2* | 4/2015 | Hunter | .................... | G06F 40/40 704/277 |
| 11,514,253 B2* | 11/2022 | Szturo | ..................... | G06F 40/58 |
| 2002/0165885 A1* | 11/2002 | Kumhyr | ................. | G06F 9/454 715/264 |
| 2003/0131320 A1* | 7/2003 | Kumhyr | ................. | G06F 9/454 715/205 |
| 2008/0127045 A1* | 5/2008 | Pratt | ....................... | G06F 9/454 704/8 |
| 2018/0143975 A1* | 5/2018 | Casal | ...................... | G06F 40/51 |
| 2023/0062336 A1* | 3/2023 | Abraham | ............ | G06F 16/2365 |

\* cited by examiner

*Primary Examiner* — Marina Lee
(74) *Attorney, Agent, or Firm* — Bookoff McAndrews, PLLC (57) ABSTRACT

Disclosed are methods, systems, and computer-readable medium for improving string localization platforms by receiving a string request including a string identifier, a string context, and a string content, the string content being in an originating language. A first request for the string request is received. A temporary string bundle including one or more machine localized string content is generated. A system validation check is performed by applying the temporary string bundle to a system environment. An approval of the string request is received based on passing the system validation check. The string request is transmitted to a localization component. A contextual localized string bundle comprising the string content and one or more context localized string content is received. The contextual localized string bundle is transmitted to a library for access by a plurality of editors.

20 Claims, 8 Drawing Sheets

PULL REQUEST INFO — 361

* FEATURE BRANCH: NEW STRING — 360
* COMMIT MESSAGE: NEW STRING FOR MAC — 362
* PULL REQUEST TITLE: US123456; NEW STRING — 364
* PULL REQUEST DESCRIPTION: NEW STRING — 366

SUBMIT — 368
BACK

STRING LOCALIZATION FOR UNIVERSAL USE

TECHNICAL FIELD

Various embodiments of the present disclosure relate generally to methods and systems for string localization and more specifically to string localization that passes system environment thresholds and facilitates universal use.

BACKGROUND

Applications and programs are generally developed for a single locale by developers located in that locale. Those applications and programs are then localized for additional locales. However, often, such localization can disturb an application or program's environment (e.g., cause errors, unintended results, etc.). Such localization is also often not universally applicable such that a given editor may receive the localization and apply it to a corresponding branch but a separate editor may not have access to the same localization and may generate a separate (e.g., potentially different) localization for use in the editor.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems, methods, and computer-readable medium are disclosed for dynamically displaying containers. For instance, a method may include: receiving a string request comprising a string identifier, a string context, and a string content, the string content being in an originating language; receiving a first request for the string request, the first request placing the string request in a pending phase; generating a temporary string bundle comprising one or more machine localized string content based on the first request; performing a system validation check by applying the temporary string bundle to a system environment; receiving an approval of the string request based on passing the system validation check, the approval placing the string request in an approved phase; transmitting the string request in the approved phase to a localization component; receiving a contextual localized string bundle comprising the string content and one or more context localized string content; and providing the contextual localized string bundle to a library for access by a plurality of editors.

Furthermore, a system may include at least one memory storing instructions; and at least one processor executing the instructions to perform operations. The operations may include: receiving a string request comprising a string identifier, a string context, and a string content, the string content being in an originating language; receiving a first request for the string request, the first request placing the string request in a pending phase; generating a temporary string bundle comprising one or more machine localized string content based on the first request; performing a system validation check by applying the temporary string bundle to a system environment; receiving an approval of the string request based on passing the system validation check, the approval placing the string request in an approved phase; transmitting the string request in the approved phase to a localization component; receiving a contextual localized string bundle comprising the string content and one or more context localized string content; and providing the contextual localized string bundle to a library for access by a plurality of editors.

Moreover, a non-transitory computer-readable medium may store instructions that, when executed by a processor, cause the processor to perform operations. The operations may include: receiving a string request comprising a string identifier, a string context, and a string content, the string content being in an originating language; receiving a first request for the string request, the first request placing the string request in a pending phase; generating a temporary string bundle comprising one or more machine localized string content based on the first request; performing a system validation check by applying the temporary string bundle to a system environment; receiving an approval of the string request based on passing the system validation check, the approval placing the string request in an approved phase; transmitting the string request in the approved phase to a localization component; receiving a contextual localized string bundle comprising the string content and one or more context localized string content; and providing the contextual localized string bundle to a library for access by a plurality of editors.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to methods and systems for dynamic component visualization.

In general, the present disclosure is directed to improving technology used to build an application (e.g., a program, a software, a build, etc.). Techniques and systems disclosed herein are directed to receiving string requests for localization. The string requests may be for any applicable part of an application such as a text string, a button, an experience, a graphic, a theme, or the like. The localization may be for one or more locales that may be identified by a user, may be automatically generated (e.g., by machine learning component), may be determined based on historic use, or the like. As a simplified example, the string request may include string content to be localized and that string content may be the word "enter."

A pull request may be created based on the string request. An output of the pull request may be to approve or reject the string request. As part of generating the pull request and/or implementing the pull request, a temporary string bundle with machine localized string content may be generated. The temporary string bundle may be a test string bundle that is used to perform a system validation check by applying the temporary string bundle to a system environment. The test may determine whether or not the temporary string bundle complies with the system environment requirements. If the test results are favorable (e.g., a binary 1 instead of 0, an approved result, a numerical value corresponding to a compatibility amount, etc.), then the string request may be approved and designated to be an approved phase.

A string request in an approved phase may be transmitted to a localization component. The localization component may be a component that provides a contextual localized string bundle comprising original string content to be localized as well as one or more context localized string content. The context localized string content may correspond to string content that is localized based on context (e.g., as provided in a string request). The contextual localized string bundle may be provided to a library for access by an original editor (e.g., software development platform) as well as one or more other editors that can access the same contextual localized string bundle from the library.

Techniques and systems disclosed herein result in a faster and more efficient use of string bundles by an editor. The contextual localized string bundles disclosed herein provide a faster retrieval of localized strings from a central repository. For example, different editors may retrieve the same contextual localized string bundle from a central repository, which may reduce the number of localization string requests, reduce correction of mismatched strings, and also reduces the storage space required to store multiple mismatched strings. Additionally, techniques disclosed herein mitigate system environment failures post contextual localization by performing a system environment check prior to generating a more resource intensive contextual localization. Such a system environment check mitigates costly resource use and reduces time spent in expending such resources.

As applied herein, localization refers to a process, technique, or to the implementation of adapting, modifying, translating, and/or adjusting content, product(s), and/or services to a local market. The local market may be determined based on geographical factors, linguistic factors, social factors, socioeconomic factors, demographics, or the like. For example, localization may be used to modify the word "on" for use in a plurality of locales, based on its context. In this example, the word "on" may refer to "turning on" (e.g., turning a mobile device on) in the United States for ages 25-80. The color associated with the word "on" for this locale may be green. A localization for the word "on" in a Spanish locale for ages 15-20 may be "encender" which refers to turning on. The color associated with this locale may be a teal color which indicates turning something on.

As applied herein, a string request may include one or more of a string identifier (e.g., a numerical value or a short hand for identifying a given string content) a string context (e.g., context that conveys "turning on"), and a string content (e.g., the word "on"). The string request may be originated by a user or may be, in whole or in part, originated by a software component configured to scrape an application for localization. The software component configured to scrape an application for localization may be a machine learning component. The software component configured to scrape an application for localization may review code and/or an interface to identify string content based on its training (e.g., training to generate a machine learning model that identifies content to be localized), based on flags or indicators associated with the content, or the like.

As applied herein, a pull request may be a request to localize string content. A pull request may be submitted after or in parallel with generating a string request. The pull request may be evaluated by a system level component that is configured to determine whether a given string request meets system criteria. The system criteria may include whether the given string request is received after a code freeze, whether a previous string request matches a new string request, whether the string request is compatible with a given application (e.g., via a system validation check, as discussed herein), or the like. The pull request may be automatically triggered and may be supplemented by a request feature branch, a commit message, a pull request title, and/or the like.

As applied herein, a temporary string bundle may be a test string bundle that includes machine generated localizations. The machine generated localizations may be non-contextual localizations that are generated using a machine component. The machine component may receive a string content as an input and may output machine localizations for one or more locales. The machine component may use any applicable technique to provide the one or more localizations such as, but not limited to, lookup tables, word associations, web results, a machine learning model, or the like. The temporary string bundle may include the string content and the one or more machine localizations.

As applied herein, a contextual localized string bundle may be include a string content and one or more contextual localized strings. The contextual localized strings may be context based localizations that are provided based one context based machine learning, user input, and/or a combination of the same. For example, a string content and string context may be provided as inputs to a localization machine learning model. The localization machine learning model may select a subset of available layers within the localization machine learning model based on the string content. The localization machine learning model may provide a contextual localized string output based on localizing the string content by applying the selected subset of available layers to the string content.

The contextual localized string bundle may be provided in any applicable format such as a JavaScript Object Notation (JSON), a comma-separated values (CSV) format, text format, or the like. The format may be determined by a given editor or may be predetermined.

Figure 1:
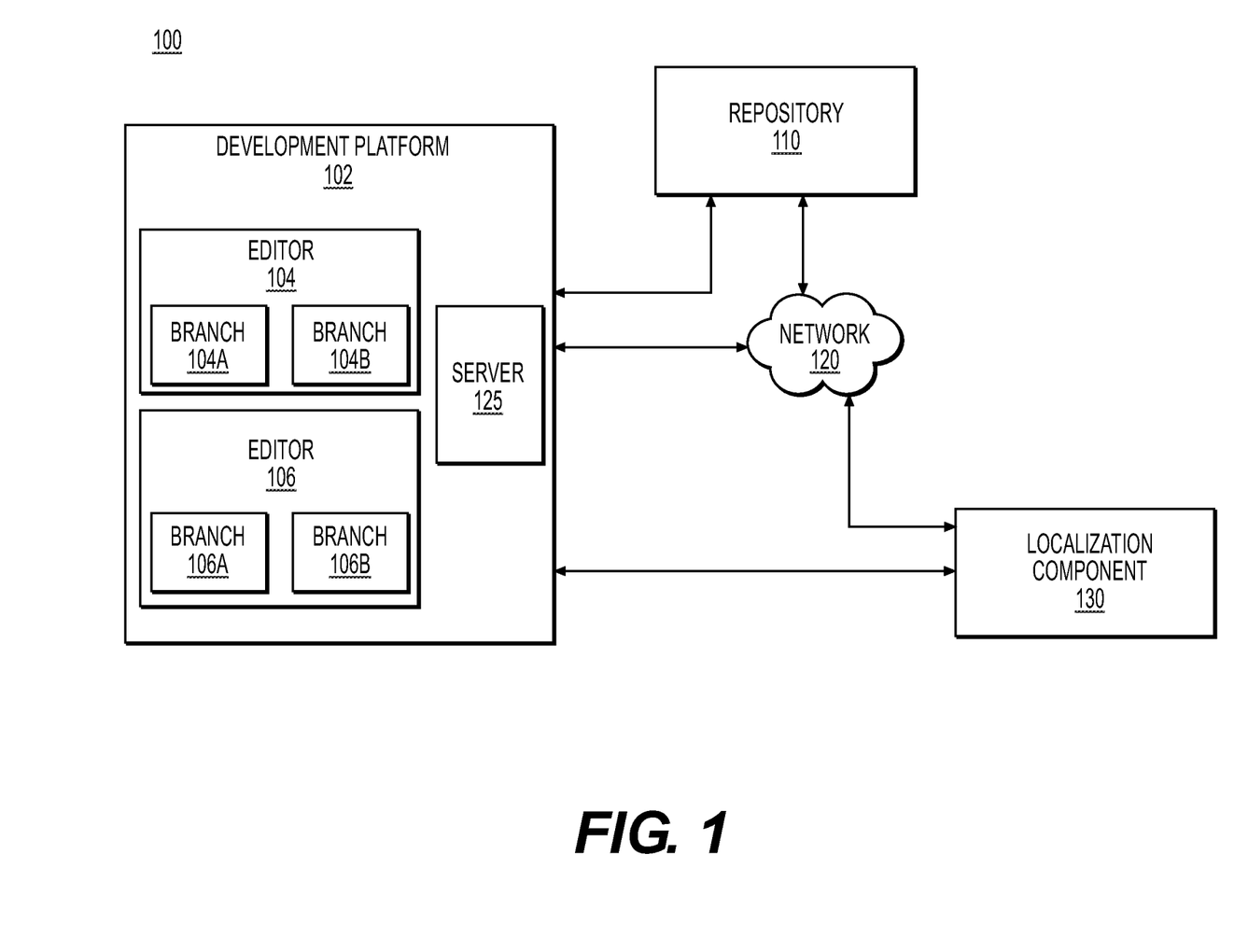
FIG. 1 depicts an exemplary block diagram of a system, according to one or more embodiments.

FIG. 1 depicts an exemplary environment 100 in which systems, methods and other aspects of the present disclosure may be implemented. Environment 100 may include a development platform 102 that may include a plurality of editors such as editor 104 and editor 106. Each editor may have respective branches such as branches 104A and 1046 for editor 104 and branches 106A and 1066 for editor 106.

As applied herein, development platform 102 may be a software platform configured to develop a given application and associated with a server 125. The application may be generated using a plurality of editors (e.g., editor 104 and editor 106), such that each editor may contribute to a component of the application. Accordingly, development platform 102, editors 104 and 106, and branches 104A, 104B, 106A, and 106B may all be or include software and/or firmware components configured to develop a given application.

First editor 104 may include branches 104A and 104B such that a given branch may correspond to a version of code associated with first editor 104. Similarly, second editor 106 may include branches 106A and 106B such that a given branch may correspond to a version of code associated with second editor 106. The development process for first editor 104 may be independent or semi-dependent on the development processor for second editor 106. One or more attributes of first editor 104 may overlap with second editor 106. For example, as further disclosed herein, a string request may be initiated at first editor 104 and a corresponding contextual localization string bundle may be called by both first editor 104 and second editor 106.

Development platform 102 (e.g., server 125 associated with development platform 102) may connect to a network 120. Server 125 may be implemented using multiple computers that cooperate to perform the functions discussed below, which may be located remotely from each other. Server 125 may be a local server, a remote server, a cloud server, or the like. Network 120 may be any suitable network or combination of networks and may support any appropriate protocol suitable for the communication of data between various components in environment 100. Network 120 may include a public network (e.g., the Internet), a private network (e.g., a network within an organization), or a combination of public and/or private networks.

Environment 100 may include one or more computer systems configured to gather, process, transmit, and/or receive data. In general, whenever environment 100 or components thereof is described as performing an operation of gathering, processing, transmitting, or receiving data, it is understood that such operation may be performed by a computer system thereof.

Development platform 102 may be connected to a localization component 130 either directly and/or via network 120. The localization component 130 may be configured to localize string content based on string context generated at development platform 102. The localization component 130 may include one or more machine learning models trained to receive string content and string context, and output contextual localized string bundles based on the same. According to an implementation, the localization component 130 may include user input mechanisms to receive user input.

Development platform 102 may be connected to a repository 110 either directly and/or via network 120. The repository 110 may store one or more contextual localized string bundles such that one or more editors (e.g., editor 104, editor 106, etc.) may access the stored contextual localized string bundles. The repository 110 may be a binary repository configured to store binary versions of the contextual localized string bundles. The repository 110 may catalogue the stored binary versions of the contextual localized string bundles such that they can be retrieved by one or more editors (e.g., editor 104, editor 106, etc.)

Figure 2:
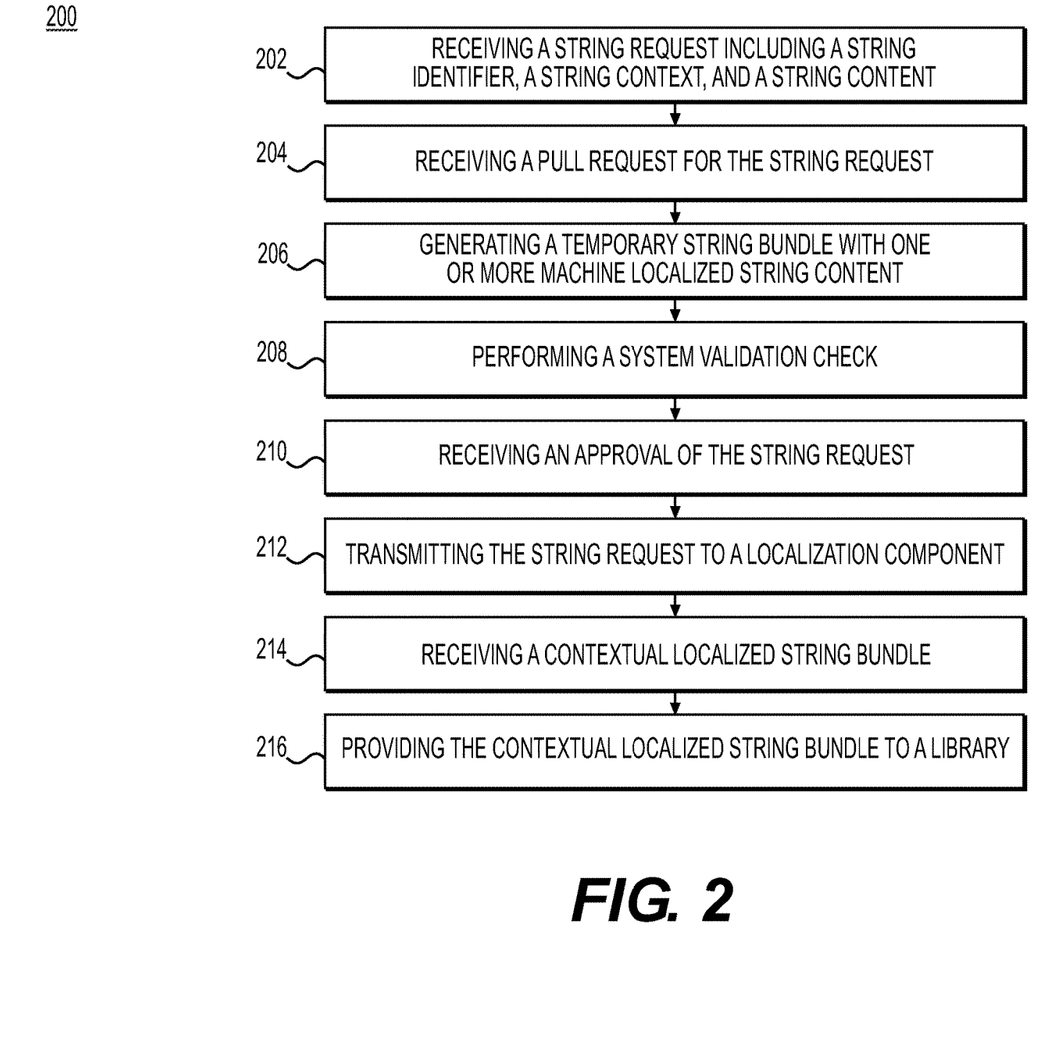
FIG. 2 depicts a flowchart for providing contextual localized string bundles, according to one or more embodiments.

FIG. 2 depicts a flowchart 200 for providing contextual localized string bundles. At 202 of flowchart 200, a string request including a string identifier, a string context, and a string content may be received. The string request may be generated at an editor (e.g., editor 104, editor 106, etc.) of development platform 102. The editor may generate the string request automatically or based on user input. A recognition component at an editor may determine one or more strings that require localization. The recognition component may be an optical character recognition (OCR) component that scans a complied version of code at the editor or the code itself to identify one or more string content for localization. The recognition component may be a scraper such as a code scraper or a compiled code scraper that may identify one or more string content for localization.

The string identifier may be automatically generated or may be received via user input. An automatically generated string identifier may assigned based on chronological order, based on a sequence, or may generate the string identifier based on the string content. Digital platform 102 may track one or more string identifiers upon generation of the string identifier and may associate the string identifier with a temporary string bundle, with a contextual localized string bundle, and/or a repository storage of the contextual localized string bundle. Repository 110 may identify a binary contextual localized string bundle based on its associated string identifier.

The string context may be auto generated or may be received via user input. An automatically generated string context may identified by a recognition component as disclosed herein. For example, an OCR component or scraping component may identify one or more strings or other content (e.g., images, themes, colors, graphics, videos, sounds, etc.) from a code or an executed version of the code associated with an editor or overall program. The identification may be based on tagged stings or content. For example, one or more text strings within a code may be tagged (e.g., via metadata or other applicable tag) as corresponding to context cues. In this example, the tagged strings may be dates, labels, titles, sub-titles, etc. The recognition component may be configured to identify string context that is proximate to string content. For example, the recognition component may limit the string context by a number of characters (e.g., two hundred characters) such that text or content that exceeds the character threshold is not applied as string context for the given string content.

At 204 of FIG. 2, a pull request for the string request may be generated. The pull request may be automatically generated and/or may be user input. According to an implementation, the pull request may be supplemented by user input such that an automatically generated pull request is completed based on additional information provided by a user. The pull request may be a request to approve the string request before resources are expended to localize the string content and to ensure that an applicable contextual localized string bundle is not already available. Accordingly, the pull request may reduce system resource use by automatically determining whether the string request is in a valid format (e.g., ensuring that the string request will not cause time intensive errors). Additionally, the pull request may reduce processing time by comparing the string request to available contextual localized string bundle (e.g., at repository 110). The pull request at 204 may place the string request in a pending phase.

The pull request may include a request feature branch, a commit message, and a pull request title. The request feature branch may be a designation of a branch (e.g., branch 104A, branch 104B, branch 106A, branch 106B, etc.) and may identify which branch in an editor's code process for which the pull request corresponds. The pull request may use the request feature branch to determine whether the given string request is applicable to the identified request feature branch. For example, a given string request may be approved, via the pull request, for a first branch but might not be approved for a second branch. The determination of whether to approve or deny for a given branch may depend on an attribute of the branch (e.g., a code freeze, a code condition, a pending code, etc.).

A commit message may be a message associated with a pull request that may be stored with the pull request and/or a corresponding contextual localized string bundle. For example, the commit message may be stored in a non-substantive portion of a contextual localized string bundle (e.g., a header, a comment, etc.). A pull request title may be automatically generated or may be assigned by a user. The pull request title may differentiate a given pull request from another pull request and may be used during a review of pull requests.

At 206, a temporary string bundle may be generated with one or more machine localized string content. The temporary string bundle may be generated as part of the pull request or may be generated based on the pull request (e.g., may be triggered as part of the pull request). The temporary string bundle may be a test string bundle that includes machine generated localizations. The machine generated localizations may be non-contextual localizations that are generated using a machine component. The machine component may receive a string content as an input and may output machine localizations for one or more locales. A string context corresponding to the string content might not be provided to the machine component. The machine component may use any applicable technique to provide the one or more localizations such as, but not limited to, lookup tables, word associations, web results, a machine learning model, or the like. The temporary string bundle may include the string content and the one or more machine localizations. The temporary string bundle may mimic the contextual localized string bundle such that it may be in a format similar to the contextual localized string bundle. For example, the temporary string bundle may be a JSON file formatted in the same format as a contextual localized string bundle.

The temporary string bundle may be a test string bundle that is used to perform a system validation check, at 208, by applying the temporary string bundle to a system environment. The system environment may be an editor environment or a development platform 102 environment. An editor environment may be an environment associated with the portion of an application with which a given editor (e.g., editor 104, editor 106, etc.) is associated. For example, an editor environment may be specific to a given feature of an application. Accordingly, the temporary string bundle may be tested against that given feature to determine whether the given feature is implementable as part of the application after insertion of the temporary string bundle. A development platform 102 environment may extend beyond the editor environment such that it may incorporate a plurality of editor environments or may incorporate an entire application. For example, the development platform 102 environment may incorporate an entire application and, accordingly, the temporary string bundle may be tested against the entire application to determine whether the entire application is implementable after insertion of the temporary string bundle.

Accordingly, a temporary string bundle based test may determine whether or not the temporary string bundle complies with the system environment requirements. If the test results are favorable (e.g., a binary 1 instead of 0, an approved result, a numerical value corresponding to a compatibility amount, etc.), then the string request may be approved and designated to be an approved phase, at 210.

According to an implementation, a temporary string bundle test may be used to determine a level of compatibility of the temporary string bundle. As disclosed herein, an editor environment or a development platform 102 environment may be used to perform a system validation check for the temporary string bundle. Accordingly, the editor environment or the developer platform 102 environment may be compiled with the temporary string bundle and the resulting compiled temporary application may be evaluated for one or more locales. A system validation check may be performed to determine errors, such as an invalid character check, a score calculation, or the like. A point value may be associated with deviations from an ideal score, as a result of the system validation check. The deviations may be determined based on compiling with the temporary string bundle and may include a line break (e.g., a text string outside predetermined parameters), an error message that prevents the code from compiling in part or full, a restricted visual effect (e.g., an "L" on a line), an invalid character, or the like. A compatibility score may be generated based on either the temporary string bundle resulting in no deviations (e.g., an ideal score such as 100) or based on one or more deviations (e.g., a score less than the ideal score). The temporary string bundle test may have an approved result at 210 if the compatibility score is at or above a threshold and may be a failed result if the compatibility score is below the threshold.

At 212 of FIG. 2, the string request may be transmitted to localization component 130 based on the approval at 210. Localization component 130 may include a localization machine learning model and/or may receive user input. The localization component 130 may output one or more contextual localized strings (e.g., for one or more locales). A contextual localized string bundle comprising original string content as well as one or more context localized string content may be generated based on the outputs of the localization component 130. According to an implementation, transmitting the string request at 212 may also include transmitting one or more additional string requests from one or more additional feature branches and/or editors such that multiple string requests can be transmitted (e.g., to a localization machine learning model) at the same time.

The localization machine learning model may include a plurality of layers and/or a plurality of weights that are configured based on the localization machine learning model's training. The model be configured to receive the string content and the string context as inputs. It may be trained to select a subset of available layers within the model based on the string content. The localization machine learning model may receive the string context, may categorize the string context based on analyzing the string content. The categorization may be done based on historical categorization provided to the localization machine learning model during its training, as further disclosed herein. The localization machine learning model may determine a contextual localized string output based on localizing the string content by applying the selected subset of available layers to the string content. Accordingly, the localization may be specific to the layers selected based on the string context.

Alternatively or additionally, the localization machine learning model may be trained to adjust one or more weights based on the string content. For example, the localization machine learning model may receive the string context, may categorize the string context based on analyzing the string content. The categorization may be done based on historical categorization provided to the localization machine learning model during its training, as further disclosed herein. The localization machine learning model may determine a contextual localized string output based on localizing the string content by applying the selected weights to the string content. Accordingly, the localization may be specific to the weights selected based on the string context.

A contextual localized string bundle may be generated based on one or more outputs of the localization machine learning model. Localization component 130, development platform 102, and/or another component may compile the string content and one or more context localized string content output by the localization component 130 to generate a contextual localized string bundle.

At 214 of FIG. 2, the contextual localized string bundle may be received. The contextual localized string bundle may be transmitted over network 120 or may be provided to development platform 102 directly. According to an implementation, the contextual localized string bundle may be formatted at the development platform 102 or at another component. The formatting may be, for example, converting the contextual localized string bundle to a storable format in repository 110. According to an example, the storable format may be a binary format such that the contextual localized string bundle is converted to binary code. At 216, the contextual localized string bundle formatted in accordance with the storable format may be stored in library, such as repository 110, such that it can be accessed by a plurality of editors (e.g., editor 104, editor 106, etc.).

One or more editors may call the contextual localized string bundle to extract the contextual localized strings contained therein. The one or more editors may call the contextual localized string bundle using a localized identifier such as any applicable pointer such as a pointer based on the string identifier, pull request title, or the like. The localized identifier may be an updated version of the string identifier, pull request title, or the like based on the contextual localized string bundle. The one or more editors may include a requesting editor (i.e., an editor that submitted the string bundle) and one or more additional editors. The one or more editors may access a contextual localized string bundle by providing a corresponding localized identifier.

According to an implementation, a subsequent string request may be generated for a subsequent string content, after the contextual localized string bundle is provided to the library at 216. A determination may be made that the subsequent string request matches the string request received at 202. The determination may be made based on comparing the string content to the subsequent string content, based on comparing the string context to the subsequent string context, comparing the pull request received at 204 to a subsequent pull request corresponding to the subsequent string request or the like. Based on determining that the subsequent string request matches the string request received at 202, the subsequent string request may be denied and a pointer to the contextual localized string bundle provided to the library at 216 may be provided. Accordingly, use of system resources and time may be mitigated by preventing the generation of a new contextual localized string bundle when an existing contextual localized string bundle applies. Additionally, storage space at the library is also reduced by preventing duplication of contextual localized string bundles.

According to an implementation, a secondary system validation check may be performed before an editor implements a contextual localized string bundle. The secondary system validation check may determine whether or not the contextual localized string bundle complies with an editor or developer platform 102's system environment requirements. If the test results are favorable (e.g., a binary 1 instead of 0, an approved result, a numerical value corresponding to a compatibility amount, etc.), then the contextual localized string bundle may be approved for use by one or more editors. For example, if approved, the contextual localized string bundle may be provided to a library.

Figure 3A:
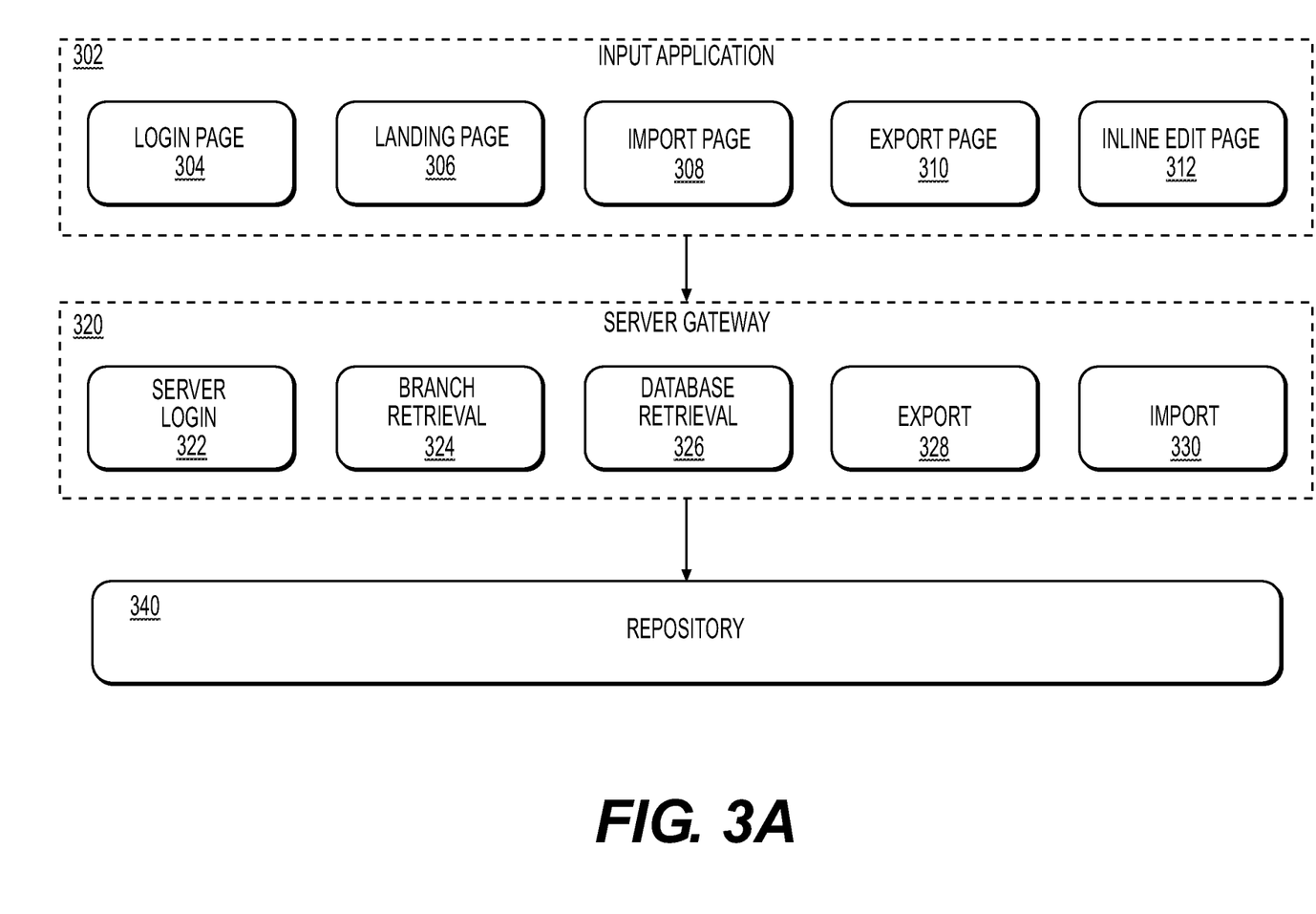
FIG. 3A depicts an application and gateway flow diagram, according to one or more embodiments.
Figure 3B:
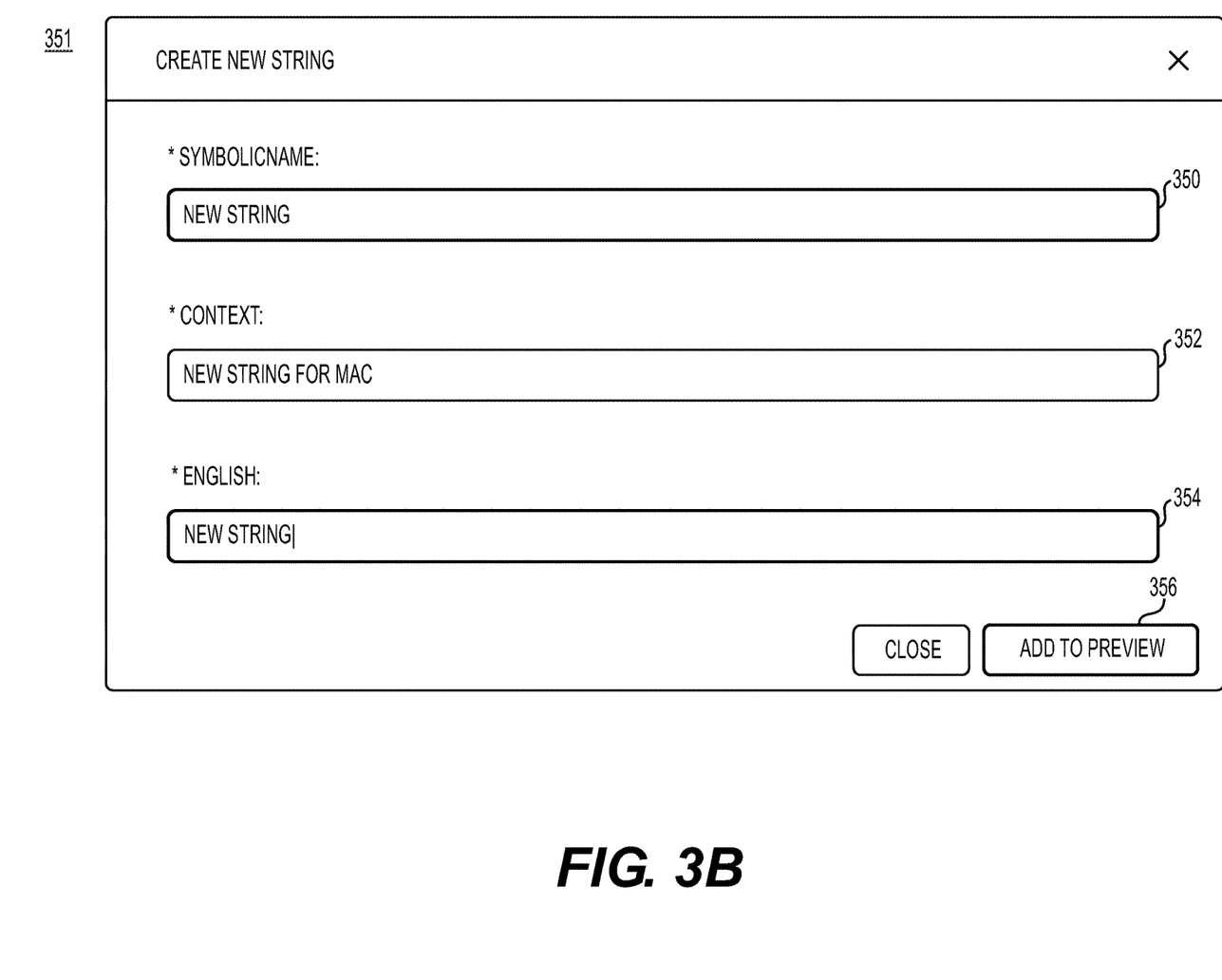
FIG. 3B depicts a string request input screen, according to one or more embodiments.

FIG. 3A depicts an application and gateway flow diagram. As shown, an input application component 302 may include a login page 304 for a user to log into an editor or development platform 102. A landing page 306 may be provided to interact with the editor and/or to select a string request, pull request, or access a library (e.g., repository 110). An import page 308 may be used for providing or augmenting a string request. For example, FIG. 3B depicts an example string request input screen 351 that may be completed automatically or may be completed in whole or party by a user. String request input screen 351 may be completed by a machine learning model, as disclosed herein, and may be provided to a user for verification. As show, string request input screen 351 may include a symbolic name field 350 (e.g., a string identifier), a context field 352 (e.g., a string context), and a string language field 354 (e.g., a string content) which may designate the language for the string content. The information included in string request input screen 351 may be committed using a button 356 and may be provided to an export page 310 of FIG. 3A. The export page 310 may include an inline edit page 312 that allows for modification of one or more attributes of a version of the string request input screen 351.

As also shown in FIG. 3A, a server gateway page 320 may include a server login page 322, a branch retrieval page 324, a database retrieval page 326, an export page 328, and an import page 330. Server login page 322 may grant access to a pull request (e.g., to view, approve, reject, etc. a given pull request). Branch retrieval page 324 may provide access to data related to a given branch (e.g., a branch associated with a pull request). Database retrieval page 326 may provide access to database data that may include historical contextual localized string bundles and associated information. Export page 328 and import page 330 may facilitate exporting string requests after a pull request has been approved and/or receiving contextual localized string bundle to facilitate modification and/or storage of the contextual localized string bundle. For example, server gateway 320 may format a received contextual localized string bundle (e.g., conversion to binary) for storage at repository 340.

Figure 3C:
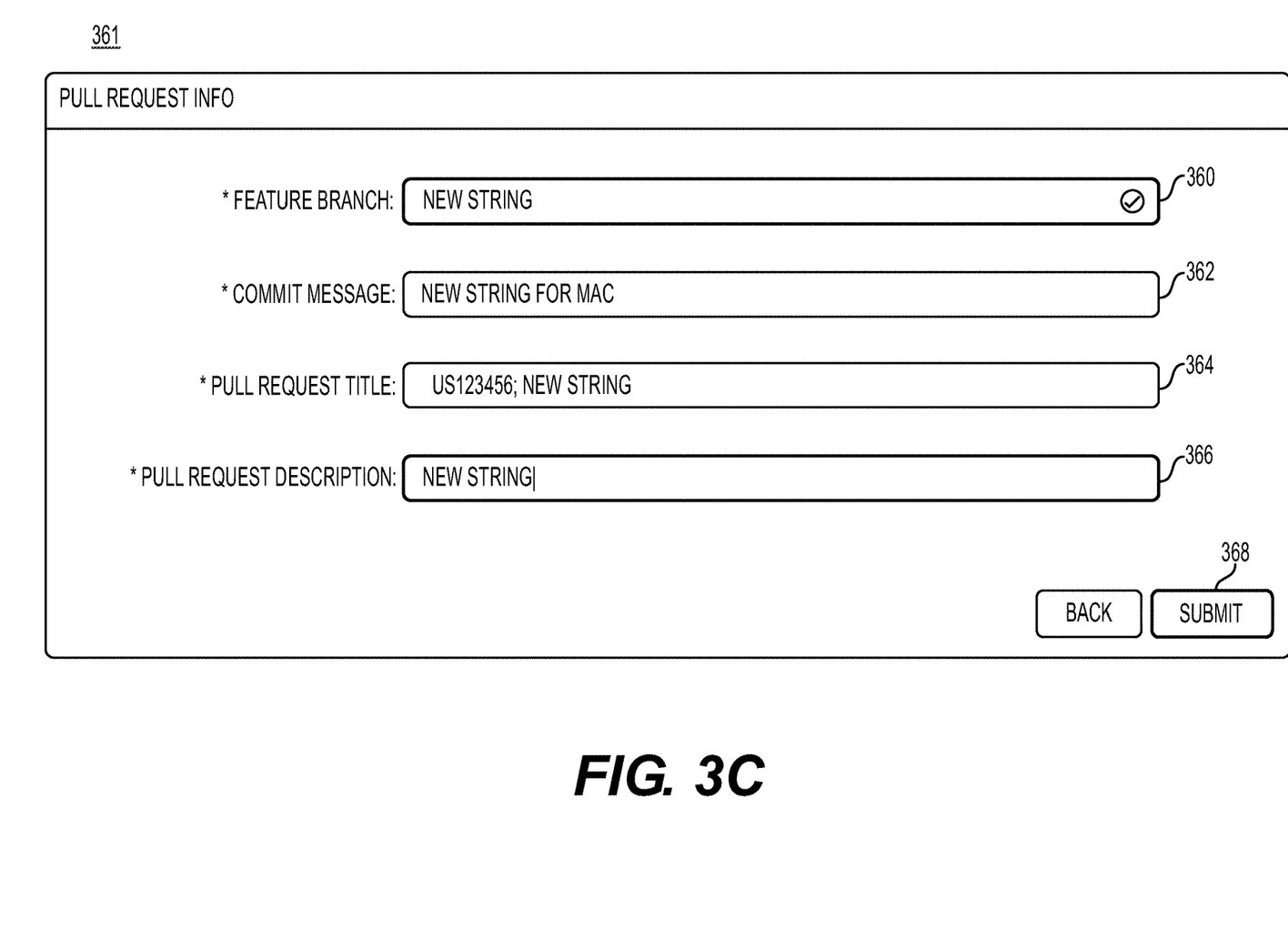
FIG. 3C depicts a pull request input screen, according to one or more embodiments.

FIG. 3C shows an example pull request input screen 361 that may be completed automatically or may be completed in whole or part by a user. Pull request input screen 361 may be completed by a machine learning model, as disclosed herein, and may be provided to a user for verification. As show, pull request input screen 361 may include a feature branch field 360 (e.g., to identify the feature branch associated with a corresponding string request), a commit message 362 (e.g., for information about the string request), a pull request title field 364 (e.g., a pull request identifier), and/or a pull request description field 366 (e.g., for information about the pull request). The information included pull request input screen 361 may be committed using a button 368 and may be provided to an export page 328 of FIG. 3A.

Figure 4:
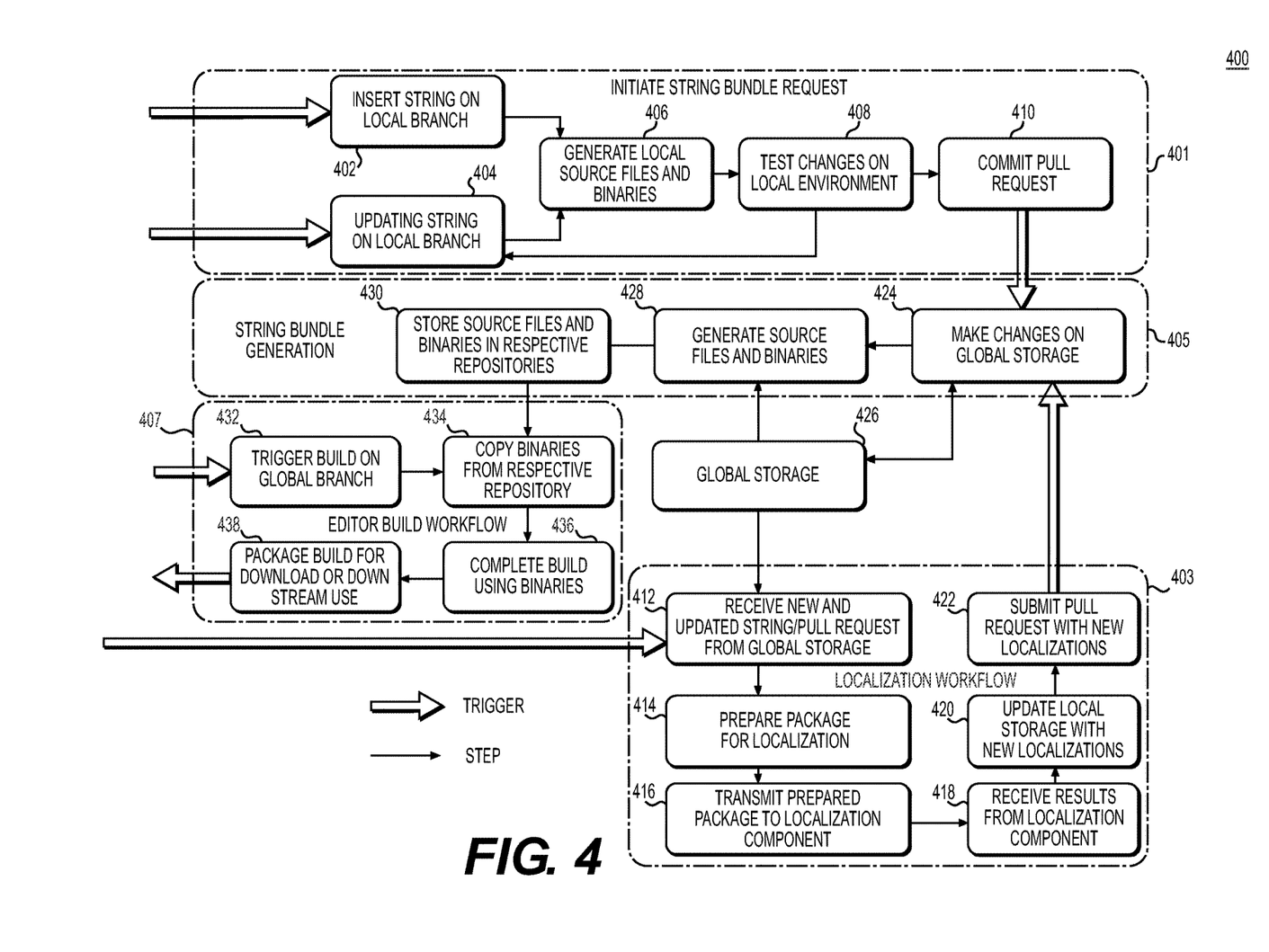
FIG. 4 depicts a system flow diagram, according to one or more embodiments.

FIG. 4 shows a system flow diagram 400 for the system and techniques disclosed herein. As shown, an initiate string bundle request 401 step may include inserting a string on a local batch at 402 or updating a string on a local batch at 404. As disclosed herein, the string may be automatically generated or may be provided by a user. Updating a string may be identifying a contextual localized string bundle and updating a string content to trigger the process outlined in FIG. 2. At 406, local source files and/or binary versions of the same may be generated. A machine translation of the string generated at 402 or 404 may be converted to a temporary string bundle and at 408 changes to a local environment may be tested. If the test fails, an update to the respective string may be made at 404 and the process may repeat. If the test passes, a pull request may be committed at 410. The string request and/or pull request may be provided to a global storage 426.

A localization workflow step 403 may include receiving new (e.g., from 402) or updated string or pull requests at 412 (e.g., from 402). The new or updated string or pull requests may be retrieved from global storage 426. At 414, a package may be prepared for localization. For example, the packet may include the string content and string context presented for localization. At 416 the prepared packet may be transmitted to a localization component (e.g., a machine learning model) and at 418 the output results from the localization component may be received. A local storage may be updated with new localizations at 420. The update may include components to generate a contextual localized string bundle such as one or more of an original string content and one or more localized string content. At 422 a pull request submission may be made and may include the components to generate a contextual localized string bundle.

At string bundle generation step 405, the pull request committed at 410 and the submission at 422 may be received to make changes to a global storage at 424. The changes may include storing pointers and/or other information related to a pull request. At 428, source files and/or binaries may be generated based on the pull request submission including the components to generate a contextual localized string bundle, as submitted at 422. As disclosed herein, the contextual localized string bundle may include an original string content and one or more contextual localized strings. At 430, source files and binaries may be stored in respective repositories for access by a plurality of editors.

At editor build workflow step 407, a trigger to build on a global branch may be received at 432. At 434, a respective repository may be accessed to copy binaries stored at 430, from the respective repository. At 436, the editor build may be completed using the binaries copied at 434 and at 438, the build may be packaged for download or downstream use (e.g., use of an application).

Figure 5:
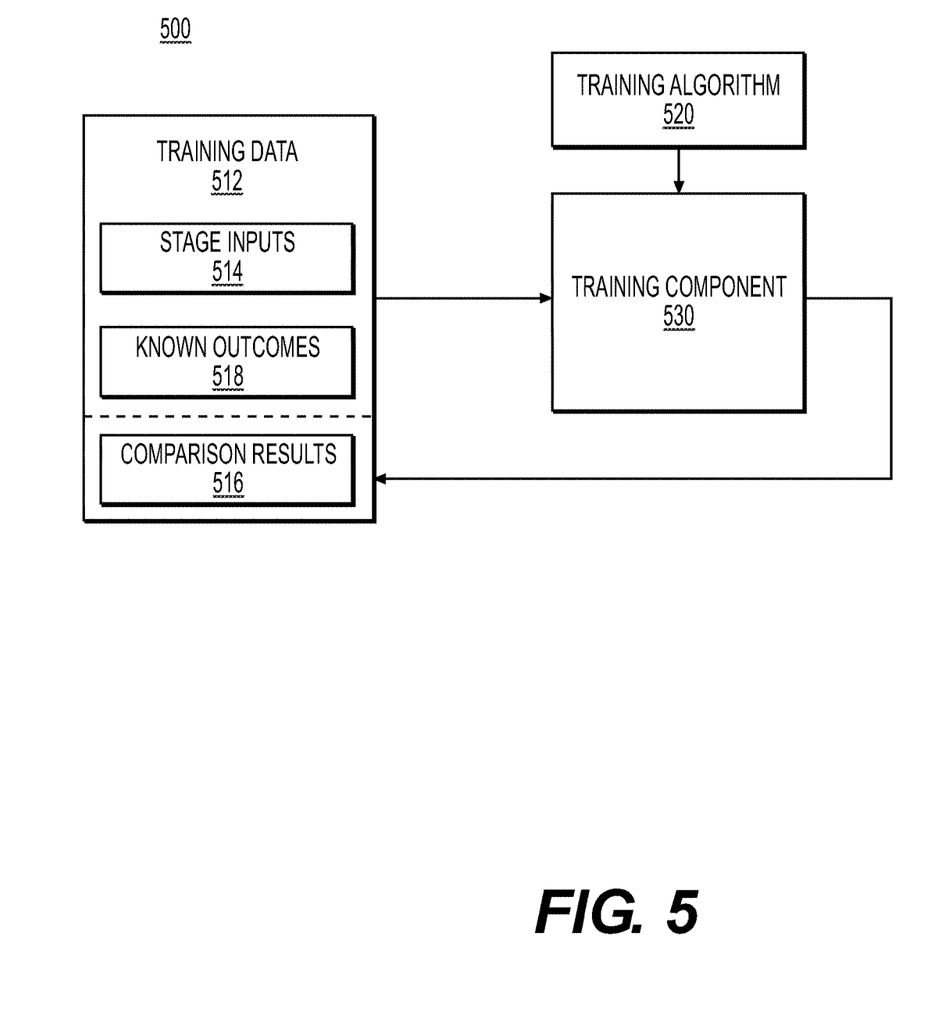
FIG. 5 depicts a machine learning model training flow, according to one or more embodiments.

As disclosed, one or more implementations described herein include a machine learning model. A machine learning model disclosed herein may be trained using the data flow 500 of FIG. 5. As shown in FIG. 5, training data 512 may include one or more of stage inputs 514 and known outcomes 518 related to a machine learning model to be trained. The stage inputs 514 may be from any applicable source including historical localizations, context categories, context attributes, etc. (e.g., one or more outputs from a step from flowchart 200 of FIG. 2). The known outcomes 518 may be included for machine learning models generated based on supervised or semi-supervised training. An unsupervised machine learning model might not be trained using known outcomes 518. Known outcomes 518 may include known or desired outputs for future inputs similar to or in the same category as stage inputs 514 that do not have corresponding known outputs.

The training data 512 and a training algorithm 520 may be provided to a training component 530 that may apply the training data 512 to the training algorithm 520 to generate a machine learning model. According to an implementation, the training component 530 may be provided comparison results 516 that compare a previous output of the corresponding machine learning model to apply the previous result to re-train the machine learning model. The comparison results 516 may be used by the training component 530 to update the corresponding machine learning model. The training algorithm 520 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

In general, any process or operation discussed in this disclosure that is understood to be computer-implementable, such as the process illustrated in FIG. 2, may be performed by one or more processors of a computer system, such any of the systems or devices in the environment of FIG. 1 as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

Figure 6:
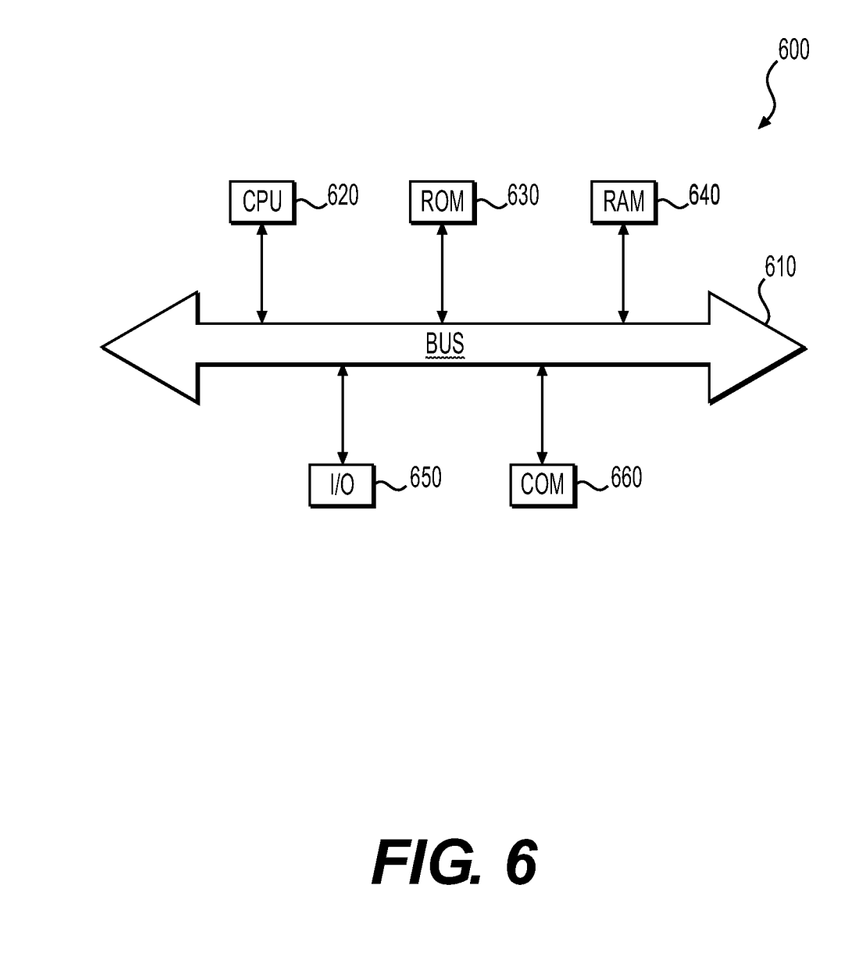
FIG. 6 depicts an example system that may execute techniques presented herein.

FIG. 6 depicts an example system 600 that may execute techniques presented herein. FIG. 6 is a simplified functional block diagram of a computer that may be configured to execute techniques described herein, according to exemplary embodiments of the present disclosure. Specifically, the computer (or "platform" as it may not be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for improving a string localization platform, the method comprising:
   receiving a string request comprising a string identifier, a string context, and a string content, the string content being in an originating language;
   receiving a first request for the string request, the first request placing the string request in a pending phase;
   generating a temporary string bundle comprising one or more machine localized string content based on the first request;
   performing a system validation check by applying the temporary string bundle to a system environment;
   receiving an approval of the string request based on passing the system validation check, the approval placing the string request in an approved phase;
   transmitting the string request in the approved phase to a localization component;
   receiving a contextual localized string bundle comprising the string content and one or more context localized string content; and
   providing the contextual localized string bundle to a library for access by a plurality of editors.

2. The method of claim 1, wherein the first request is a pull request, the pull request comprising a request feature branch, a commit message, and a pull request title.

3. The method of claim 1, wherein transmitting the string request comprises transmitting the string request and one or more additional string requests from one or more additional feature branches.

4. The method of claim 1, wherein the plurality of editors comprises a requesting editor associated with the string request and one or more additional editors.

5. The method of claim 4, further comprising assigning a localized identifier to the contextual localized string bundle.

6. The method of claim 5, wherein the contextual localized string bundle is accessed by an editor by providing the localized identifier.

7. The method of claim 1, wherein the contextual localized string bundle is a JavaScript Object Notation (JSON) file.

8. The method of claim 1, wherein the system validation check comprises an invalid character check.

9. The method of claim 1, further comprising:
performing a secondary system validation check by applying the contextual localized string bundle to the system environment; and
providing the contextual localized string bundle to the library based on the contextual localized string bundle passing the secondary system validation check.

10. The method of claim 1, wherein the string content is an updated version of a component of an existing contextual localized string bundle.

11. The method of claim 1, further comprising:
converting the contextual localized string bundle into a binary format; and
storing the converted contextual localized string bundle into a binary repository, wherein access by the plurality of editors is provided via the binary repository.

12. A system for improving a string localization platform, the system comprising:
at least one memory storing instructions; and
at least one processor executing the instructions to perform operations, the operations comprising:
receiving a string request comprising a string identifier, a string context, and a string content, the string content being in an originating language;
receiving a first request for the string request, the first request placing the string request in a pending phase;
generating a temporary string bundle comprising one or more machine localized string content based on the first request;
performing a system validation check by applying the temporary string bundle to a system environment;
receiving an approval of the string request based on passing the system validation check, the approval placing the string request in an approved phase;
transmitting the string request in the approved phase to a localization component;
receiving a contextual localized string bundle comprising the string content and one or more context localized string content; and
providing the contextual localized string bundle to a library for access by a plurality of editors.

13. The system of claim 12, wherein the first request is a pull request, the pull request comprising a request feature branch, a commit message, and a pull request title.

14. The system of claim 12, wherein the plurality of editors comprises a requesting editor associate with the string request and one or more additional editors.

15. The system of claim 12, wherein the contextual localized string bundle is a JavaScript Object Notation (JSON) file.

16. The system of claim 12, wherein the system validation check comprises an invalid character check.

17. The system of claim 12, wherein the operations further comprise:
performing a secondary system validation check by applying the contextual localized string bundle to the system environment; and
providing the contextual localized string bundle to the library based on the contextual localized string bundle passing the secondary system validation check.

18. The system of claim 12, further comprising:
converting the contextual localized string bundle into a binary format; and
storing the converted contextual localized string bundle into a binary repository, wherein access by the plurality of editors is provided via the binary repository.

19. A non-transitory computer-readable medium storing instructions that, when executed by a processor, cause the processor to perform operations, the operations comprising:
receiving a string request comprising a string identifier, a string context, and a string content, the string content being in an originating language;
receiving a first request for the string request, the first request placing the string request in a pending phase;
generating a temporary string bundle comprising one or more machine localized string content based on the first request;
performing a system validation check by applying the temporary string bundle to a system environment;
receiving an approval of the string request based on passing the system validation check, the approval placing the string request in an approved phase;
transmitting the string request in the approved phase to a localization component;
receiving a contextual localized string bundle comprising the string content and one or more context localized string content; and
providing the contextual localized string bundle to a library for access by a plurality of editors.

20. The non-transitory computer-readable medium of claim 19, wherein the operations further comprise:
performing a secondary system validation check by applying the contextual localized string bundle to the system environment; and
providing the contextual localized string bundle to the library based on the contextual localized string bundle passing the secondary system validation check.

* * * * *